US012766347B2

(12) United States Patent
Goodwin et al.

(10) Patent No.: US 12,766,347 B2
(45) Date of Patent: Oct. 20, 2026

(54) PORTABLE INDUSTRIAL ANCHOR SYSTEM

(71) Applicants: Robert Goodwin, Las Vegas, NV (US); Chad Umbel, Las Vegas, NV (US); Andrew Fulton, Las Vegas, NV (US); Chad Zipprich, Las Vegas, NV (US)

(72) Inventors: Robert Goodwin, Las Vegas, NV (US); Chad Umbel, Las Vegas, NV (US); Andrew Fulton, Las Vegas, NV (US); Chad Zipprich, Las Vegas, NV (US)

(73) Assignee: RIG FALL PROTECTION, LLC, Las Vegas, NV (US)

(*) Notice: Subject to any disclaimer, the term of this patent is extended or adjusted under 35 U.S.C. 154(b) by 277 days.

(21) Appl. No.: 18/659,089

(22) Filed: May 9, 2024

(65) Prior Publication Data

US 2025/0345640 A1 Nov. 13, 2025

(51) Int. Cl.
*A62B 35/00* (2006.01)

(52) U.S. Cl.
CPC ........ *A62B 35/0068* (2013.01); *A62B 35/005* (2013.01)

(58) Field of Classification Search
CPC ..... A62B 35/0068; E04G 21/3276; F16L 3/24
See application file for complete search history.

(56) References Cited

U.S. PATENT DOCUMENTS 497,679 A * 5/1893 Newbury .................. F16L 3/24 248/72
631,887 A * 8/1899 Clark ........................ F16L 3/14 248/62
(Continued)

FOREIGN PATENT DOCUMENTS

CA 2208340 A1 * 12/1998 ......... A62B 35/0068
CA 2959679 A1 * 5/2017
(Continued)

OTHER PUBLICATIONS https://www.wernerco.com/us/products/fall-protection/anchorage-connectors/A5500Series/A560000 Anchor System.
(Continued)

*Primary Examiner* — Daniel P Cahn
*Assistant Examiner* — Benjamin Alexander Pezzlo
(74) *Attorney, Agent, or Firm* — Trent Baker; BAKER IP PLLC

(57) ABSTRACT

The invention relates to a portable beam anchor system configured for remote attachment and release comprising a beam clamp system, a right and left housing, and an attachment system. The beam clamp system includes a right and left clamp, a latch mechanism, a support member, and a rope attachment member. The size of the right and left clamp and support member correspond to the size of a beam. The right and left housing are positioned to substantially cover the right and left clamp. The attachment system is configured to remotely, slidably translate the right and left clamp toward one another on the support member. The low friction member is coupled to one of the right and left housing. The attachment line extends over the low friction member coupled to one of the housings and is fixably coupled to the other housing.

20 Claims, 9 Drawing Sheets

(56) References Cited

U.S. PATENT DOCUMENTS

| | | | | | | |
|---|---|---|---|---|---|---|
| 919,558 | A | * | 4/1909 | Doran | F16L 3/24 | 248/72 |
| 1,245,047 | A | * | 10/1917 | Sherman | F16L 3/24 | 248/74.1 |
| 1,275,053 | A | * | 8/1918 | Leiding | A47L 3/04 | 52/37 |
| 1,473,504 | A | * | 11/1923 | Neely | B60M 7/00 | 191/40 |
| 1,616,275 | A | * | 2/1927 | Olsen | E04G 17/18 | 249/211 |
| 1,707,894 | A | * | 4/1929 | Bergesen, Sr. | E04G 3/18 | 182/60 |
| 1,891,588 | A | * | 12/1932 | Claus | E06B 9/02 | 410/151 |
| 2,470,991 | A | * | 5/1949 | Kindorf | F16L 3/24 | 248/72 |
| 2,583,613 | A | * | 1/1952 | Talbott | A47L 3/00 | 49/55 |
| 2,765,139 | A | * | 10/1956 | White | E04B 9/18 | 248/228.4 |
| 2,868,485 | A | * | 1/1959 | Friel | F16L 3/24 | D8/355 |
| 2,877,974 | A | * | 3/1959 | Estes | F16B 2/12 | 248/228.3 |
| 2,916,244 | A | * | 12/1959 | Renfroe | B66C 1/64 | 105/154 |
| 3,162,476 | A | * | 12/1964 | Renfroe | B66C 1/64 | 294/104 |
| 3,217,833 | A | * | 11/1965 | Smith | E04G 21/3261 | 248/228.5 |
| 3,632,152 | A | * | 1/1972 | Renfroe | B66C 1/64 | 294/82.19 |
| 3,834,751 | A | * | 9/1974 | Brackin | B66C 1/442 | 294/92 |
| 3,863,911 | A | * | 2/1975 | McWilliams | B25B 5/00 | 269/37 |
| 3,879,078 | A | * | 4/1975 | Turner | B66C 1/64 | 294/67.31 |
| 3,995,904 | A | * | 12/1976 | Matthews | B66C 1/64 | 294/104 |
| 4,037,824 | A | * | 7/1977 | Whitmer | A62B 35/0087 | 256/53 |
| 4,052,028 | A | * | 10/1977 | Cordero, Jr. | A62B 35/04 | 248/228.1 |
| 4,285,095 | A | * | 8/1981 | Janson | E05D 15/0652 | 52/837 |
| 4,294,053 | A | * | 10/1981 | Lopes | E04B 1/34347 | 52/295 |
| 4,410,175 | A | * | 10/1983 | Shamp | A63B 69/0022 | 114/215 |
| 4,721,182 | A | * | 1/1988 | Brinkmann | A62B 35/0081 | 182/36 |
| 4,866,797 | A | * | 9/1989 | Vollan | E04G 25/00 | 52/126.6 |
| 4,928,789 | A | * | 5/1990 | Claeys | E04G 21/3276 | 182/7 |
| 5,002,152 | A | * | 3/1991 | Lebow | E04G 21/3276 | 182/191 |
| 5,092,426 | A | * | 3/1992 | Rhodes | A62B 35/0068 | 269/228 |
| 5,325,788 | A | * | 7/1994 | Strickland | A62B 35/0056 | 105/157.1 |
| 5,397,042 | A | * | 3/1995 | Pedrini | B60R 9/058 | 224/329 |
| 5,526,896 | A | * | 6/1996 | O'Rourke | A62B 35/0068 | 182/36 |
| 5,529,144 | A | * | 6/1996 | Henderson | A62B 35/0056 | 248/231.41 |
| 5,711,397 | A | * | 1/1998 | Flora | E04G 21/3242 | 248/228.3 |
| 5,863,020 | A | * | 1/1999 | Olson | E04G 21/3242 | 248/228.3 |
| 5,897,088 | A | * | 4/1999 | Kirschner | F16L 3/24 | 248/62 |
| 5,947,424 | A | * | 9/1999 | Heath | F16B 21/16 | 248/58 |
| 6,053,279 | A | * | 4/2000 | McKenna | A62B 35/0081 | 182/36 |
| 6,076,633 | A | * | 6/2000 | Whitmer | E04G 21/3276 | 182/36 |
| 6,092,623 | A | * | 7/2000 | Collavino | E04G 21/3295 | 182/45 |
| 6,158,729 | A | * | 12/2000 | Tsai | B25B 5/12 | 269/201 |
| 6,173,809 | B1 | * | 1/2001 | Cole | E04G 21/3276 | 182/3 |
| 6,334,285 | B1 | * | 1/2002 | Kirschner | F16L 55/18 | 249/23 |
| 6,691,827 | B2 | * | 2/2004 | Lycett | A62B 35/0068 | 182/138 |
| 6,962,234 | B1 | * | 11/2005 | Reeves | E04G 21/3261 | 182/36 |
| 7,000,730 | B1 | * | 2/2006 | Ostrobrod | E04G 5/045 | 182/36 |
| 7,828,118 | B2 | * | 11/2010 | Barbara | B61D 23/00 | 182/127 |
| 8,061,672 | B1 | * | 11/2011 | Kaufman | E04B 2/82 | 248/228.3 |
| 8,312,966 | B1 | * | 11/2012 | Guthrie | E04G 5/045 | 182/36 |
| 8,480,041 | B2 | * | 7/2013 | Myers | F16L 3/1211 | 248/228.3 |
| 8,646,575 | B1 | * | 2/2014 | Guthrie | A62B 35/0068 | 182/36 |
| 8,708,099 | B2 | * | 4/2014 | Fortin | E04G 21/3295 | 248/500 |
| 8,973,705 | B2 | * | 3/2015 | Guthrie | A62B 35/0068 | 24/165 |
| 8,991,883 | B1 | * | 3/2015 | Butterfield, IV | B66C 1/64 | 294/67.3 |
| 9,989,171 | B2 | * | 6/2018 | Beelen | F16L 3/20 | |
| 10,060,146 | B2 | * | 8/2018 | Simmons | A62B 35/0068 | |
| 10,266,183 | B1 | * | 4/2019 | Napieralski | B61B 3/00 | |
| 10,612,573 | B2 | * | 4/2020 | Recker | F16B 2/12 | |
| 10,898,742 | B1 | * | 1/2021 | Arbuckle | A62B 35/0068 | |
| 11,047,408 | B2 | * | 6/2021 | Roman | F16B 2/065 | |
| 11,286,968 | B1 | * | 3/2022 | Hung | F16B 45/002 | |
| D1,077,282 | S | * | 5/2025 | Viberg | D25/133 | |
| 12,371,894 | B2 | * | 7/2025 | Rasmussen | E04B 1/388 | |
| 12,422,091 | B2 | * | 9/2025 | Pollard | A62B 35/0068 | |
| 2003/0006095 | A1 | * | 1/2003 | Desjardins | A62B 35/0087 | 182/36 |
| 2007/0101894 | A1 | * | 5/2007 | Britcher | A63B 69/305 | 104/89 |
| 2007/0163834 | A1 | * | 7/2007 | Casebolt | A62B 1/04 | 182/3 |
| 2011/0155505 | A1 | * | 6/2011 | Liang | A62B 35/0093 | 182/3 |
| 2013/0228394 | A1 | * | 9/2013 | Sousa | E04G 21/3295 | 248/231.41 |
| 2015/0157885 | A1 | * | 6/2015 | Liu | E04G 21/32 | 182/3 |
| 2016/0138634 | A1 | * | 5/2016 | Zhang | E04B 1/5812 | 52/698 |
| 2016/0356050 | A1 | * | 12/2016 | Tsaousis | E04G 5/045 | |
| 2017/0089058 | A1 | * | 3/2017 | Roth | E04B 1/5812 | |
| 2019/0118369 | A1 | * | 4/2019 | Denton | G01B 3/002 | |

FOREIGN PATENT DOCUMENTS

| | | | | | |
|---|---|---|---|---|---|
| CN | 203889906 | U | * | 10/2014 | |
| GB | 2024304 | A | * | 1/1980 | F16B 45/002 |
| WO | WO-2004101912 | A2 | * | 11/2004 | A62B 1/04 |

OTHER PUBLICATIONS https://www.wernerco.com/us/products/fall-protection/anchorage-connectors/A5500Series/A550000 Anchor System.

(56) References Cited

OTHER PUBLICATIONS https://www.wernerco.com/us/products/fall-protection/anchorage-connectors/A5500Series/A550030 Anchor System.

* cited by examiner

SECTIONA-A

SECTIONB-B

SECTIONC-C

PORTABLE INDUSTRIAL ANCHOR SYSTEM

FIELD OF THE INVENTION

The invention generally relates to portable industrial anchor systems and methods of operation. In particular, the present invention relates to a system that facilitates a releasable beam anchor which can be attached and released from a remote location.

BACKGROUND OF THE INVENTION

Various industrial activities require utilization of a rope while working at elevated locations. These activities are often referred to as rigging, rope access, industrial climbing, and commercial climbing. The rope may be used to both access the elevated location and/or protect the user while working in the elevated location. In order to utilize a rope for these activities, the rope must be secured to some form of anchor at an elevated location corresponding to the location at which the user intends to perform work. For example, the anchor must be located above and within the vicinity of the location at which the user intends to work. The anchor at which the rope attaches must be secured to some type of structural support member, such as a beam, header, pole, wall, etc. The anchor must also create an attachment point upon which the rope may attach without risk of cutting or damaging the rope.

One of the common challenges in rope access activities is the initial attachment of the anchor and the rope in proximity to the desired location of work. Many rope access activities are performed in locations that do not provide convenient elevated access for securing a rope. In these situations, a user must somehow access the elevated location to create an anchor which can then be used to secure a rope. The conventional solution to facilitate the necessary initial access is to set up a temporary access structure or utilize a moveable machine. The temporary structure may include scaffolding or ladder systems positioned to allow the user to access the location at which the anchor and rope may be attached. Likewise, a machine such as a hydraulic forklift, aerial work platform (AWP), bucket truck, cherry picker, etc. elevates a user to a location at which they may attach the anchor and rope. These conventional solutions are both time consuming and expensive.

Therefore, there is a need in the industry for a portable industrial anchor system which can be attached to an elevated support structure from a remote location without requiring additional structures or machines.

SUMMARY OF THE INVENTION

The present invention relates to portable industrial anchor systems and methods of operation. One embodiment of the present invention relates to a portable beam anchor system configured for remote attachment and release, comprising a beam clamp system, a right and left housing, and an attachment system. The beam clamp system includes a right and left clamp, a latch mechanism, a support member, and a rope attachment member. The right and left clamp are slidably coupled on the support member. The latch mechanism includes a latched state and a released state. The latched state of the latch mechanism restricts the slidable coupling of the right and left clamp on the support member. The size of the right and left clamp and support member correspond to the size of a beam. The right and left housing are positioned to substantially cover the right and left clamp. The attachment system includes a low friction member such as a pulley and an attachment line. The attachment system is configured to remotely slidably translate the right and left clamp toward one another on the support member. The low friction member is coupled to one of the right and left housing. The attachment line extends over the low friction member coupled to one of the housings and is fixably coupled to the other housing. A second embodiment of the present invention relates to a method for remotely attaching a beam clamp system to a beam. The method includes the act of providing a beam clamp system and a right and left housing with an attachment system consistent with the first embodiment of the invention. The method further includes the acts of attaching a pole to the pole attachment, positioning the beam clamp system across a beam; retracting the attachment line causing the right and left clamp to translate toward one another along the support member, and clamping the beam clamp system across the beam.

Embodiments of the present invention represent a significant advance in the field of industrial anchor systems. Conventional portable anchor systems require a user to utilize additional support structures or machines to attach the system to an elevated location. Embodiments of the present invention allow a user to remotely attach the system to a beam to facilitate rope access in a location that would otherwise require additional structures.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to portable industrial anchor systems and methods of operation. One embodiment of the present invention relates to a portable beam anchor system configured for remote attachment and release comprising a beam clamp system, a right and left housing, and an attachment system. The beam clamp system includes a right and left clamp, a latch mechanism, a support member, and a rope attachment member. The right and left clamp are slidably coupled on the support member. The latch mechanism includes a latched state and a released state. The latched state of the latch mechanism restricts the slidable coupling of the right and left clamp on the support member. The size of the right and left clamp and support member correspond to the size of a beam. The right and left housing are positioned to substantially cover the right and left clamp. The attachment system includes a low friction member such as a pulley and an attachment line. The attachment system is configured to remotely slidably translate the right and left clamp toward one another on the support member. The low friction member is coupled to one of the right and left housing. The attachment line extends over the low friction member coupled to one of the housings and is fixably coupled to the other housing. A second embodiment of the present invention relates to a method for remotely attaching a beam clamp system to a beam. The method includes the act of providing a beam clamp system and a right and left housing with an attachment system consistent with the first embodiment of the invention. The method further includes the acts of attaching a pole to the pole attachment, positioning the beam clamp system across a beam; retracting the attachment line causing the right and left clamp to translate toward one another along the support member, and clamping the beam clamp system across the beam. Also, while embodiments are described in reference to an industrial anchor system it will be appreciated that the teachings of the present invention are applicable to other areas including but not limited to recreational anchor systems.

The following terms are defined as follows:

Definitions

Beam—a wide flange W-Section, a wide flange H beam, and a standard S-Section I beam.

Beam clamp system—a system configured to clamp across a beam, thereby supporting a rope attachment member in proximity to the beam.

Low friction member—a member across which a rope or string may translate with a low amount of friction such as a pulley or curved surface.

Figure 1:
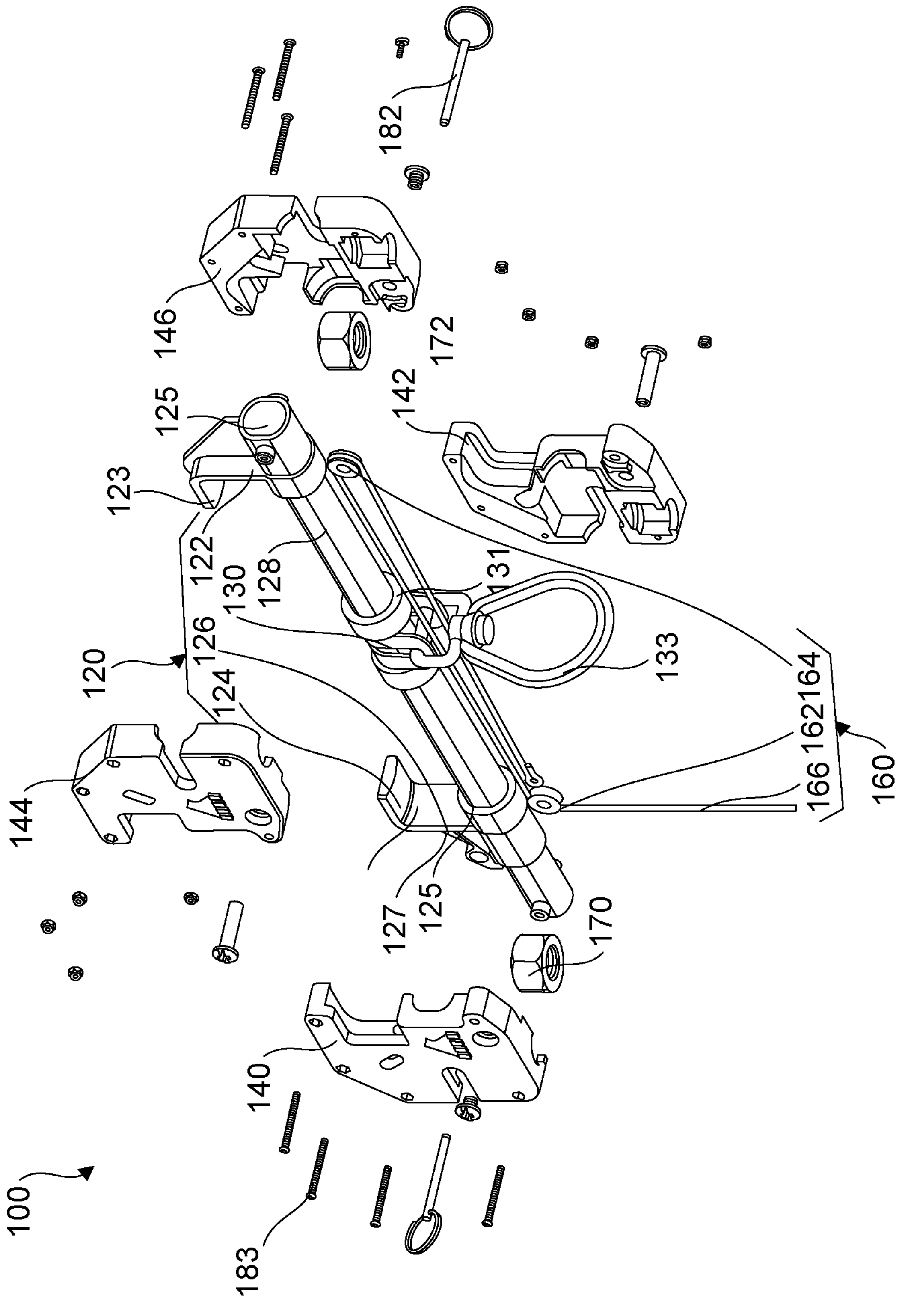
FIG. 1 illustrates an exploded perspective view of a portable industrial anchor system in accordance with embodiments of the present invention.
Figure 5:
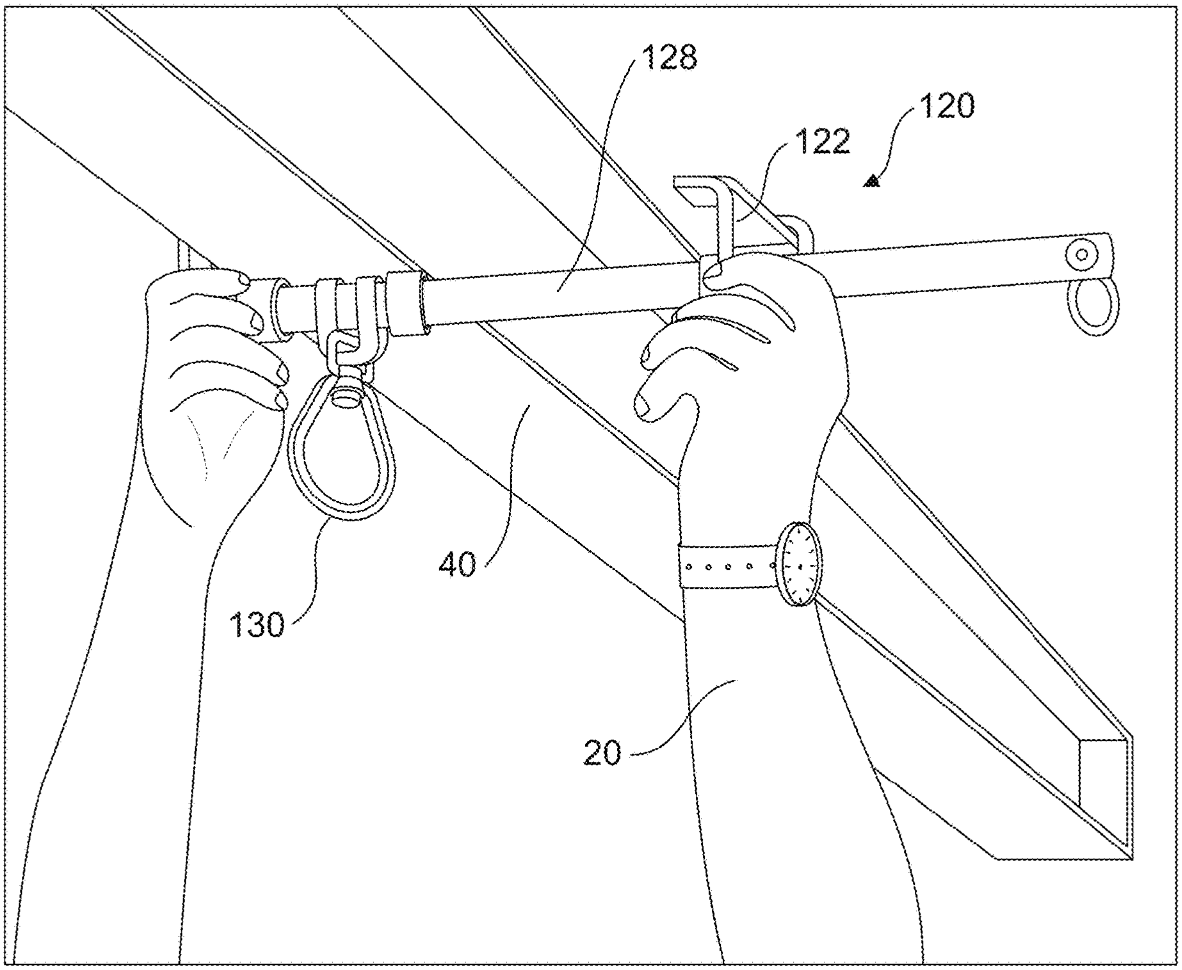
FIG. 5 illustrates an operational perspective view of the beam clamp system of FIG. 4 clamping over a beam.

Reference is initially made to FIG. 1, which illustrates a portable industrial anchor system, designated generally at 100. The system includes a beam clamp system 120, a front and rear left housing 140, 142, a front and rear right housing 144, 146, an attachment system 160, and a left and right pole attachment 170, 172. The beam clamp system 120 is to clamp over a beam 40 (see FIGS. 5 and 7) so as to create an anchor on which a rope may be attached. The size of the components of the beam clamp system 120 correspond to the size of a beam 40 (see FIG. 5) to facilitate the clamping. The beam clamp system 120 further includes a right clamp 122, left clamp 124, a latch mechanism 126, a support member 128, and a rope attachment member 130. The right and left clamp 122, 124 each include an open recess 123 region corresponding to the horizontal lower region of a beam 40. The open recess 123 regions of the right and left clamps 122, 124 are oriented toward one another. The right and left clamp 122, 124 also include a lower recess 125 to couple with the support member 128. The lower recess 125 of the right and left clamp 122, 124 corresponds in shape to the cross-sectional shape of the support member 128. The support member 128 is an elongated, rod-like member that is longer than the width of a beam. In the illustrated embodiment, the left clamp 124 is slidably coupled to the support member 128, and the right clamp 122 is fixably coupled to the support member 128. It will be appreciated that alternative beam clamp systems 120 may be utilized in which both the right and left clamp 122, 124 are slidably coupled to the support member 128. The left clamp 124 includes a latch mechanism 126 which includes a latched state and a released state. The latched state restricts the slidable coupling between the left clamp 124 and the support member 128. The latch mechanism 126 further includes a spring-biased, rotating lever 127 that engages with one of a plurality of notches on the support member 128 to effectuate the latched state. The latch mechanism 126 may be rotated to engage the released state by disengaging the rotating lever 127 from one of the plurality of notches on the support member 128. Therefore, when the latch mechanism 126 is in the latched state, the left clamp 124 is prevented from translating away from the right clamp 122. However, the shape and orientation of the latch mechanism 126 allows the left clamp 124 to translate toward the right clamp 122 in both the latched state and released state when a sufficient force is applied. FIG. 5 will illustrate in more detail how a force applied to the left clamp 124 in the direction of the right clamp 122 causes the latch mechanism 126 to rotate, thereby overcoming the spring bias and jumping the latch from one of the plurality of notches to the next plurality of notches. A rope attachment member 130 is coupled to the support member 128 to create a location at which a rope may be attached without the risk of abrasion or cutting. The illustrated rope attachment member 130 includes a coupling member 131 and a lower ring 133. The lower ring is swivel-coupled with respect to the support member 128 to optimize functionality of the rope attachment member 130.

The system 100 further includes coupling the housings 140, 142, 144, 146 to the clamps 122, 124. The left front housing 140 and the left rear housing 142 fixably couple to one another and releasably couple substantially over the left clamp 124. Likewise, the right front housing 144 and right rear housing 146 fixably couple to one another and releasably couple substantially over the right clamp 122. The fixable coupling between the left front housing 140 and the left rear housing 142 is secured with a plurality of couplers such as screws. The releasable coupling 181 between the left housing 140, 142 and the left clamp 124 is secured with a left housing release pin 180. When the left housing release pin 180 is removed, the left housing 140, 142 is released from the left clamp 124. Likewise, the releasable coupling 181 between the right housing 144, 146 and the right clamp 122 is secured with a right housing release pin 182. When the right housing release pin 182 is removed, the right housing 144, 146 is released from the right clamp 122. The fixable coupling between the right front housing 144 and the left rear housing 146 is secured with a plurality of couplers such as screws 183. The shape of the housings 140, 142, 144, 146 may leave a portion of the respective clamps 122, 124 exposed to facilitate the coupling with the beam 40. The left and right housings 140, 142, 144, 146 include a left and right pole attachment 170, 172 respectively. The illustrated pole attachments 170, 172 are female-threaded recesses which correspond to a male-threaded member on the end of pole 190 (shown in FIG. 7). The pole attachments 170, 172 allow a user to attach a pole 190 to the system 100 to facilitate remote attachment to a beam 40.

The attachment system 160 includes a left pulley 162, right pulley 164, and attachment line 166. The left and right pulley 162, 164 may generally be described as low-friction members and may be replaced by other low-friction members such as a curved member. Likewise, it will be appreciated that only one low friction member is necessary for the functioning of the attachment system 160. The left pulley 162 is fixably secured to a lower portion of the left housing 140, 142 and the right pulley 164 is fixably secured to a lower portion of the right housing 144, 146. In the illustrated embodiment, the attachment line 166 extends around the left pulley 162, around the right pulley 162, and is secured to the left clamp 124. The illustrated configuration creates a beneficial 2:1 mechanical advantage in the attachment line 166. It will be appreciated that the attachment line 166 could alternatively extend around a single low friction member coupled to the left clamp 122 and secure to the right clamp 122, so as to function without the mechanical advantage. The configuration of the attachment line 166 allows a user to retract the attachment line 166 from a remote location, and thereby exert a force upon the left clamp 124 that causes it to translate toward the right clamp 122. This action effectively clamps the left clamp 124 and right clamp 122 together over a beam located therebetween. The operation of the attachment line will be described in more detail in reference to FIGS. 5 and 7.

Figure 2:
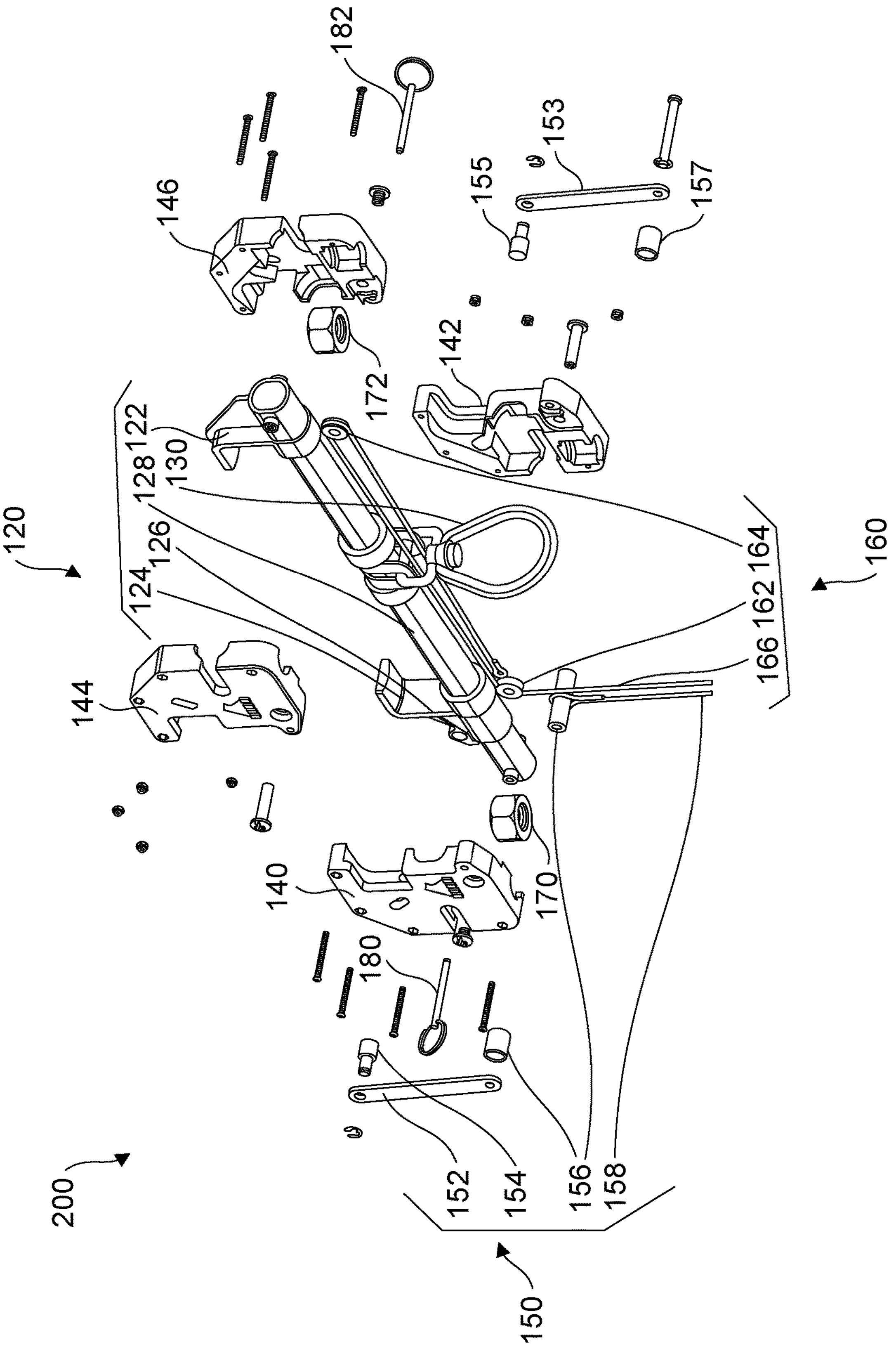
FIG. 2 illustrates an exploded perspective view of an alternative portable industrial anchor system including a release system in accordance with embodiments of the present invention.

Reference is next made to FIG. 2, which illustrates an alternative embodiment of a portable industrial anchor system that further includes a release system 150, designated generally at 200. The alternative system 200 includes the same beam clamp system 120, housings 140, 142, 144, 146, and attachment system 160 as the embodiment illustrated in FIG. 1. The additional release system 150 includes a release arm 152, a secondary release arm 153, a release pivot 154, a secondary release pivot 155, a release attachment 156, a secondary release attachment 157, and a release line 158. It will be appreciated that the secondary release arm 153, secondary release pivot 155, and secondary release attachment 157 are optional components which allow a user to reorient the release system to either left or right housing 140, 142, 144, 146. In the illustrated embodiment, only the release arm 152, release pivot 154, and release attachment 156 are operational. The release line 158 is coupled to the release arm 152 via the release attachment 156. The release arm 152 is rotatably coupled to the left housing 140, 142 about the release pivot 154. The release attachment 156 is coupled to the latch mechanism 126 and the release line 158. The release line 158 is configured to engage the released state of the latch mechanism 126 when retracted. In particular, retracting the release line 158 from a remote location by a user 20 rotates the illustrated latch mechanism 126 into the released state that allows the left clamp 123 to translate with respect to the support member 128. Therefore, a user 20 may retract the release line 158 and exert a particular force on the pole 190 that translates the left clamp 124 away from the right clamp 122, thereby disengaging the system 200 from a beam 40 (not shown).

Figure 3A:
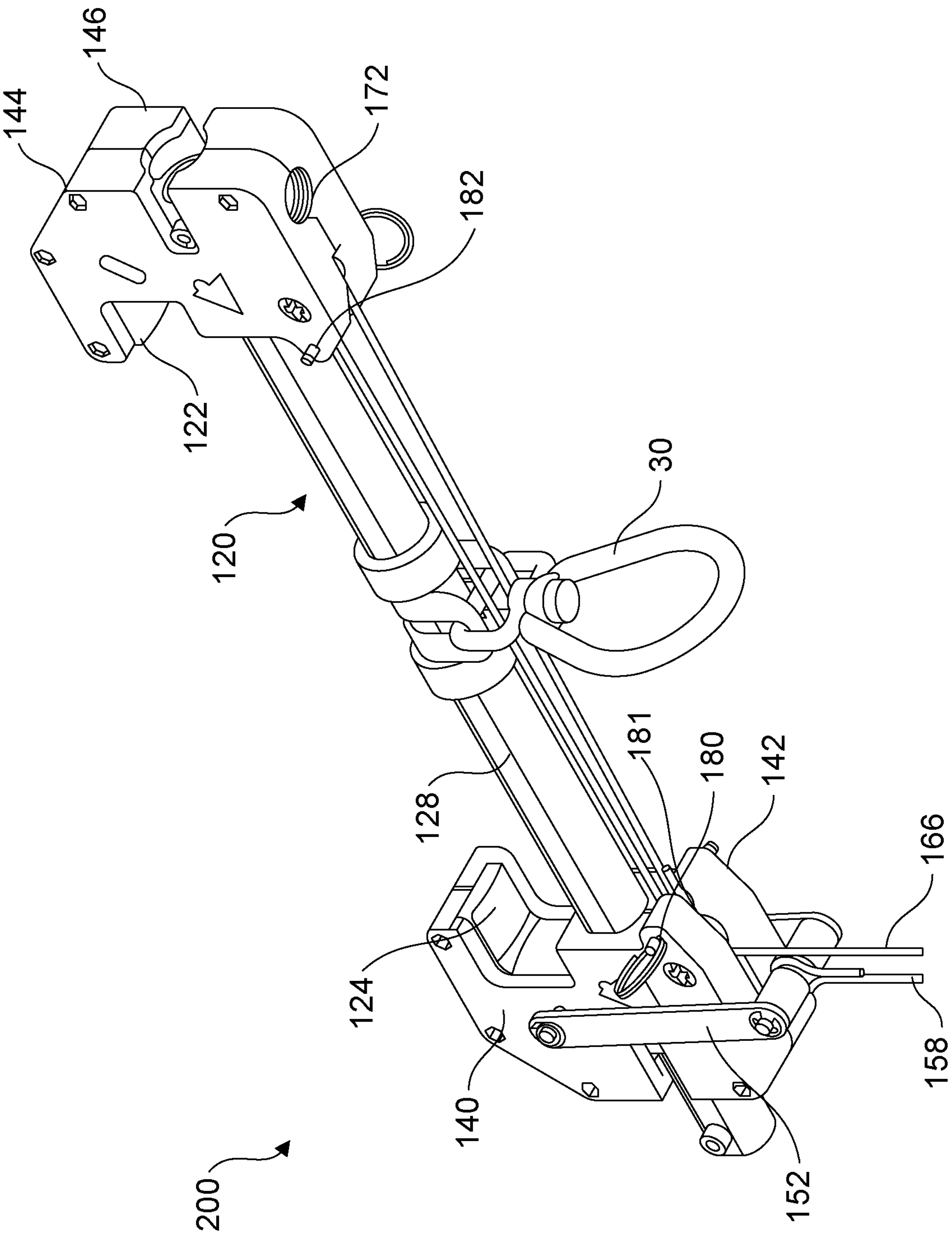
FIG. 3A illustrates a perspective view of the embodiment illustrated in FIG. 2.
Figure 3B:
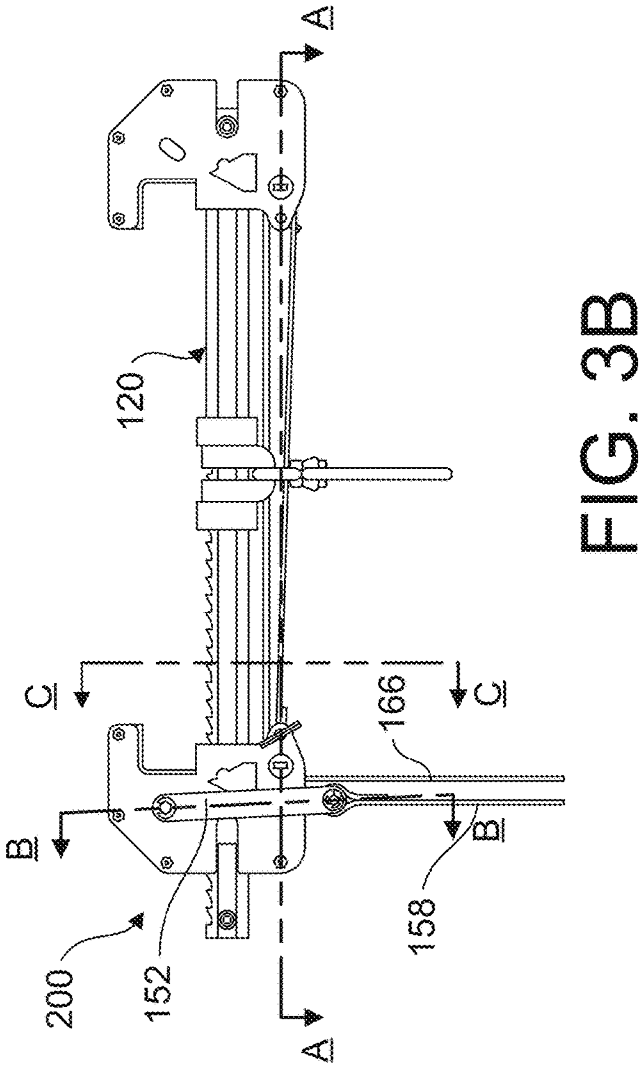
FIG. 3B illustrates a profile view of the embodiment illustrated in FIG. 2 with cross-sections AA, BB, and CC.
Figure 3C:
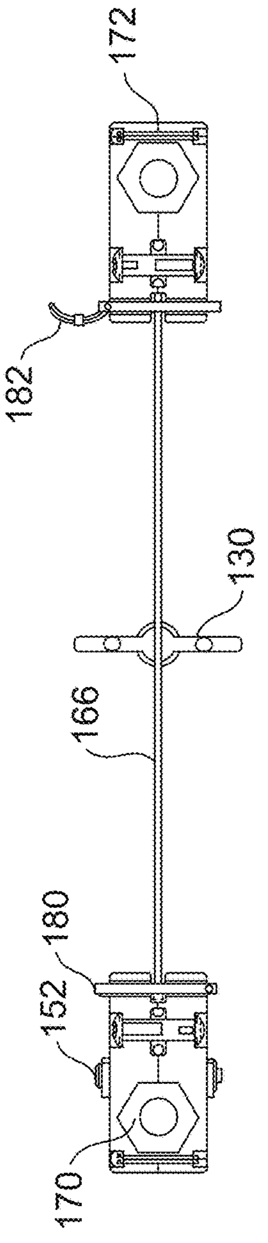
FIG. 3C illustrates a cross-sectional view of section AA from FIG. 3B.
Figure 3E:
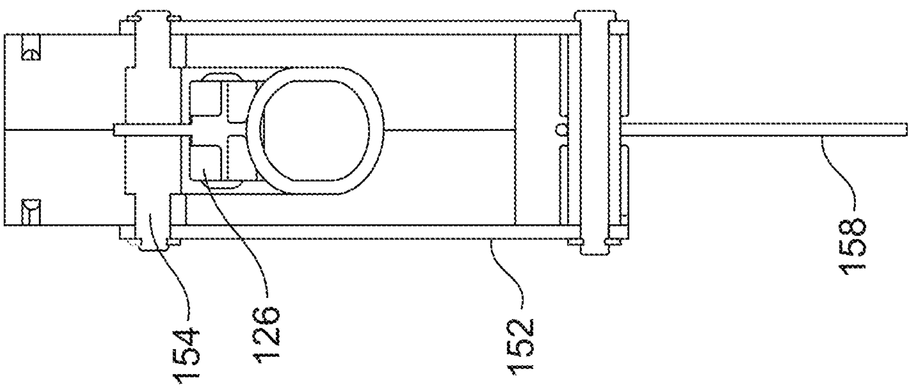
FIG. 3E illustrates a cross-sectional view of section CC from FIG. 3C.
Figure 3D:
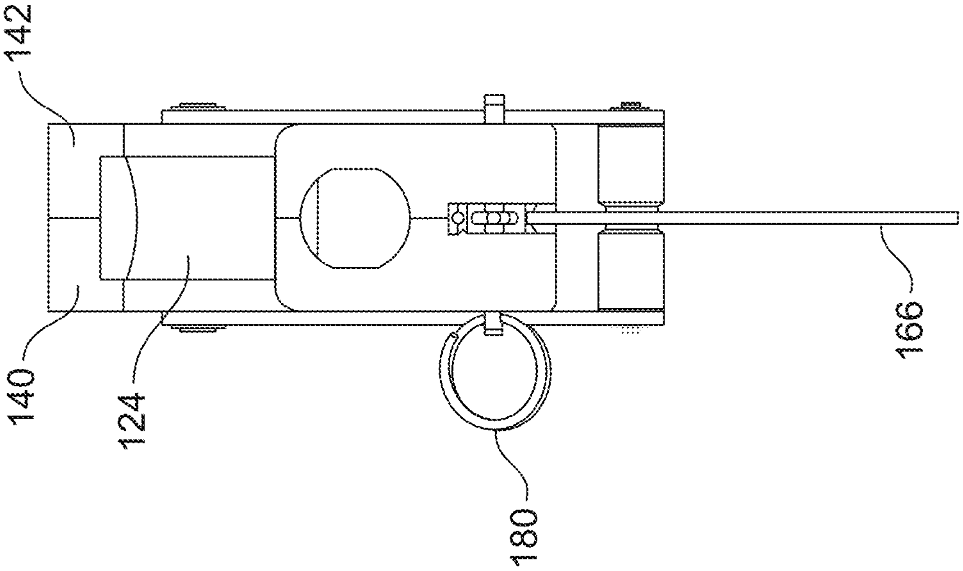
FIG. 3D illustrates a cross-sectional view of section BB from FIG. 3B.

Reference is next made to FIGS. 3A-E, which illustrate various views of the system 200 illustrated in FIG. 2. FIG. 3A illustrates a reference perspective view of the system 200. FIG. 3B illustrates a profile view of system 200 with sections AA, BB, and CC delineated for reference. FIG. 3C illustrates a cross-sectional view along the section AA of FIG. 3B. FIG. 3D illustrates a cross-sectional view along the section BB of FIG. 3B. FIG. 3E illustrates a cross-sectional view along the section CC of FIG. 3B.

Figure 4:
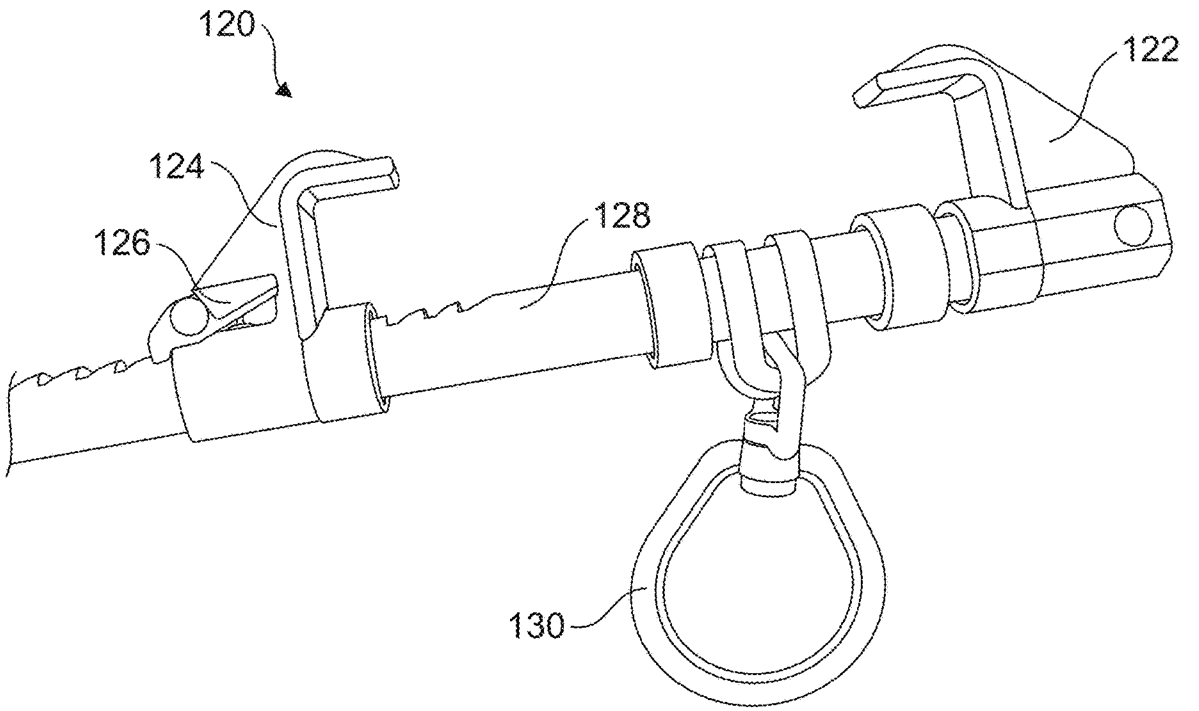
FIG. 4 illustrates a detailed perspective view of a beam clamp system element in accordance with embodiments of the present invention.

FIG. 4 illustrates a detailed perspective view of the beam clamp system 120 illustrated in FIGS. 1 and 2. The beam clamp system 120 includes a right clamp 122, a left clamp 124, a latch mechanism 126, a support member 128, and a rope attachment member 130. The latch mechanism 126 includes a spring-biased lever that hooks into the notches on the support member 128 is illustrated in the latched state. The illustrated latch mechanism 126 is shown in the latched state, which includes the spring biased lever positioned to hook into a notch on the support member 128. This prevents the left clamp 124 from translating away from the right clamp 122. The plurality of notches on the support member 128 include a triangular shape that corresponds to the shape and orientation of the spring biased lever. The illustrated spring biased lever of the latch mechanism 126 may rotate clockwise into the released state to allow the left clamp 124 to translate along the support member 128 toward the right clamp 122. Therefore, when a force is applied to the left clamp 124 in the direction of the right clamp 122, the spring-biased lever will overcome the spring biasing to rotate out of the latched state as the left clamp 124 translates toward the right clamp 122.

Figure 7:
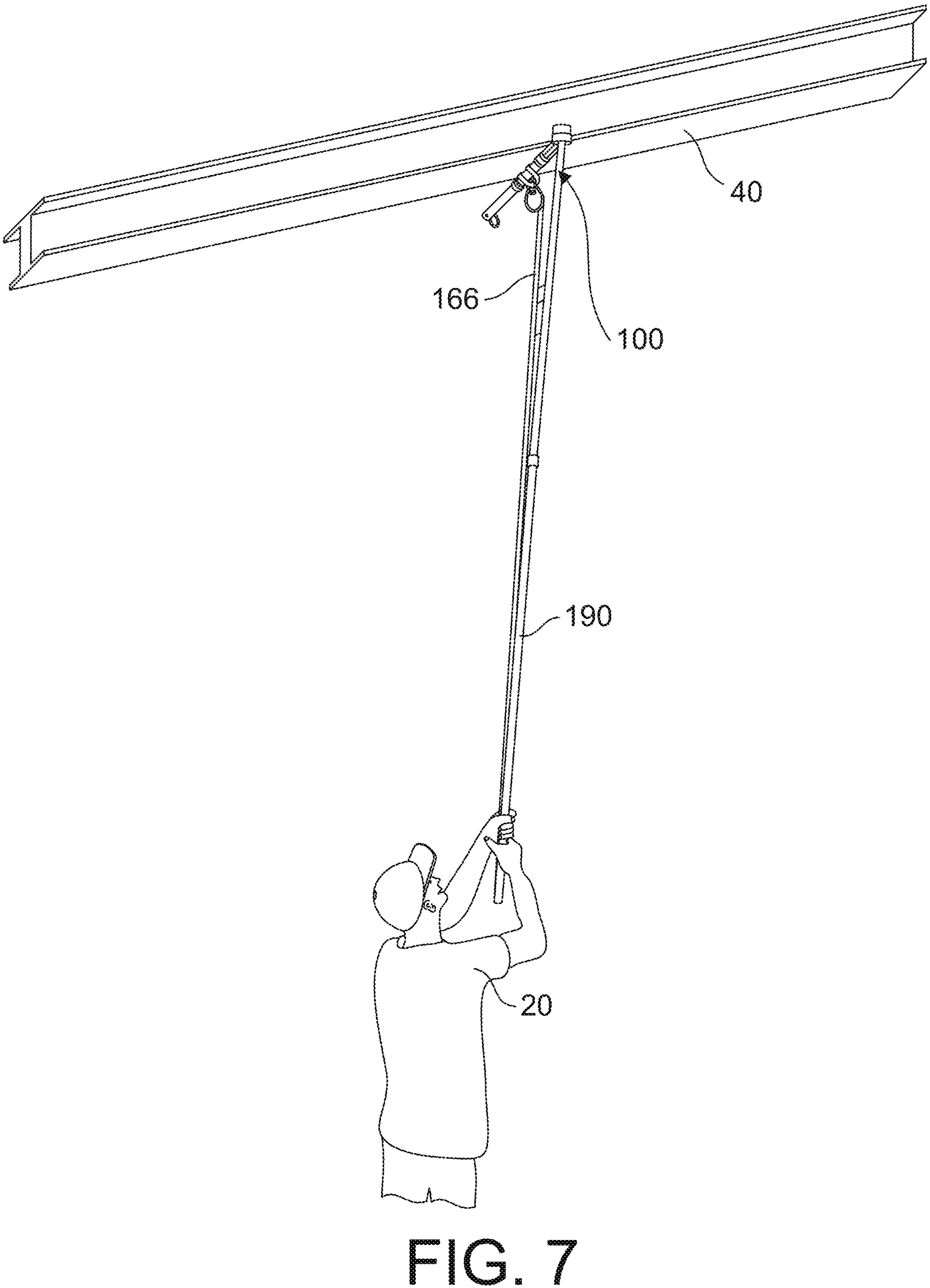
FIG. 7 illustrates an operational perspective view of the system remotely attaching to a beam in accordance with embodiments of the invention.

FIG. 5 illustrates an operational view of a beam clamp system 120 clamping over a beam 40 in accordance with embodiments of the present invention. The illustrated view is intended to demonstrate the operation of the beam clamp system 120 in proximity to the beam 40. Embodiments of the present invention allow a user 20 to perform these operations from a remote location via the attachment system 160 and a pole 190 as illustrated in FIG. 7. The user 20 is holding the beam clamp system 120 with both hands over the beam 40 such that the lower flange of the beam 40 is positioned between the left and right clamp 122, 124. The user 20 may then exert a compression force between their hands to cause the left clamp 124 to overcome the latch mechanism 126 and translate along the support member 128 and clamp the beam 40. Once the left and right clamps 122, 124 are secured across the beam 40, the latch mechanism 126 is biased toward the latched state, thereby preventing the left and right clamps 122, 124. The beam 40 is thereby secured between the left and right clamps 122, 124, the support member 128 and the rope attachment member 130. A user 40 may secure a rope to the rope attachment member 130 with a variety of well-known methods to perform rope access activities. FIG. 7 will illustrate this same process from a remote location.

Figure 6:
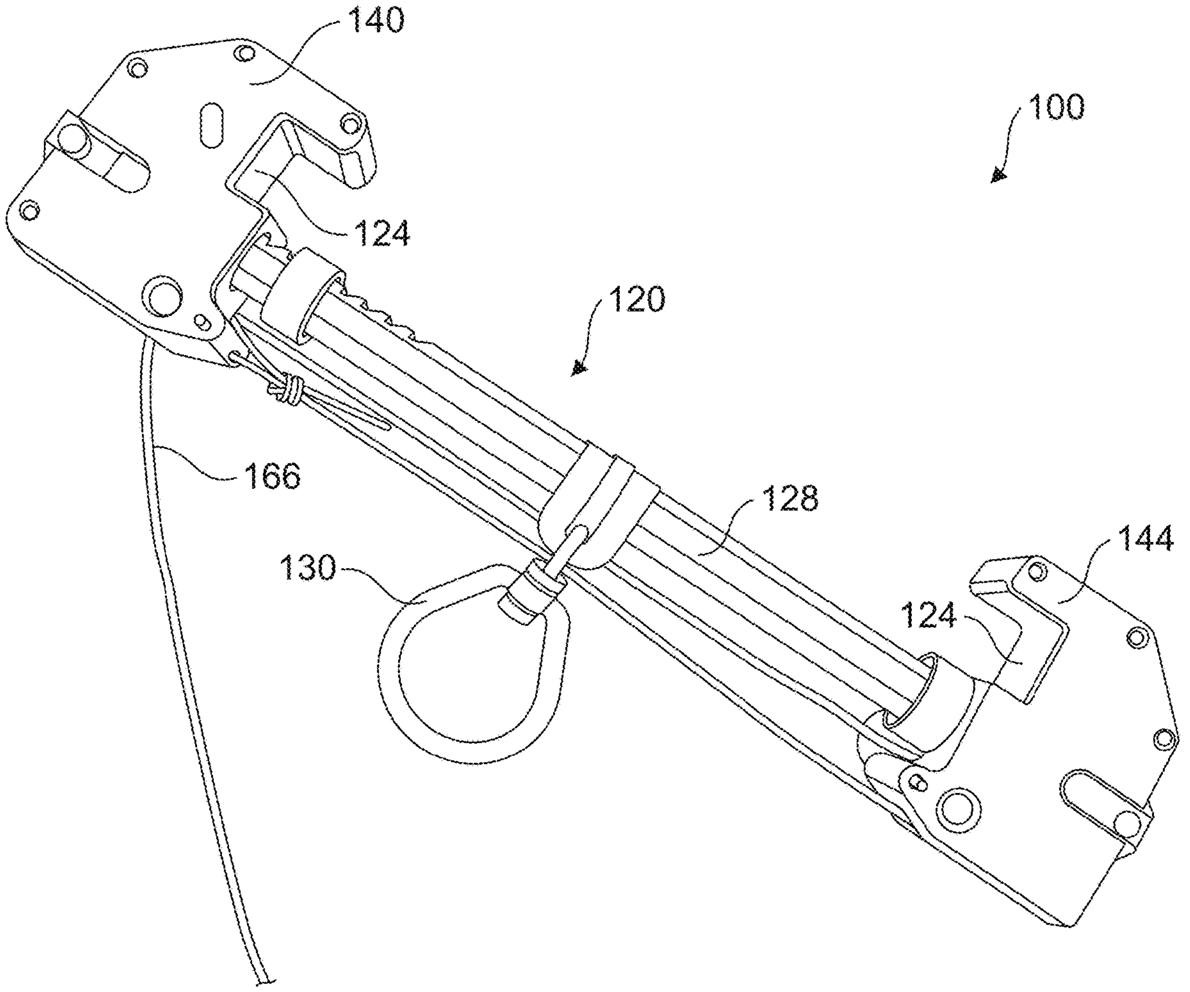
FIG. 6 illustrates a perspective view of the system illustrated in FIG. 1.

FIG. 6 illustrates an assembled perspective view of the system 100 illustrated in FIG. 1. The assembled view illustrates the coupling of the housings 140, 142, 144, 146 substantially over the clamps 122, 124. The left and right pulleys 162, 164 are within the housings 140, 142, 144, 146 respectively. Likewise, the attachment line 166 extends into the housings 140, 142, 144, 146 in order to extend around the left and right pulleys 162, 164. The assembled housings 140, 142, 144, 146 sandwich couple the attachment system 160, pole attachments 170, 172, and beam clamp system 120 in proximity to one another.

FIG. 7 illustrates an operational view of a user 20 remotely attaching the system 100 to a beam 40 via a pole 190 in accordance with embodiments of the present invention. The pole 190 is attached to the system 100 via the right pole attachment 172. The user 20 is supporting the pole 190 and the system 100 so as to position the system 100 across the beam 40. The attachment line 166 extends from the system 100 down the pole 190 to allow the user 20 to selectively retract the attachment line 166 from the remote location when the system 100 is properly positioned across the beam 40. Therefore, a method of operation for the system 100 includes attaching the pole 190 to the system via one of the pole attachments 170, 172. The user 20 positions the beam clamp system 120 across a beam 40 such that the lower portion of the beam 40 is between the left and right clamps 122, 124. The user 20 retracts the attachment line 166, causing the left and right clamps 122, 124 to translate toward one another. It will be appreciated that while the left and right clamps 122, 124 translate toward one another, only one of the clamps 122, 124 may translate with respect to the support member 128. The system 100 is then securely clamped across the beam 40 such that the rope attachment member 130 is secured in proximity to the beam 40. The pole 190 may be removed from the system 100 by rotating the pole 190 and disengaging the threaded coupling at the right pole attachment 172. The user 20 may then use known techniques for remotely attaching a rope to the rope attachment member 130, including but not limited to using a stick clip head on the pole 190. A stick clip head may be attached to the end of the pole 190 once it is removed from the system 100. The stick clip head is a known device that releasably holds a carabiner in an open position on the end of a pole. The user 20 may secure the rope to the end of the pole with the stick clip head and attach the rope to the rope attachment member 130 of the system 100 via the carabiner. The pole 190 may be removed, leaving the rope secured to the system 100 in proximity to the beam 40, allowing rope access functions in the vicinity of the beam 40.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. A portable beam anchor system configured for remote attachment and release, the system being configured to clamp onto a beam, comprising:

a beam clamp system including a right and left clamp, at least one latch mechanism, and a support member, wherein at least one of the right and left clamp are slidably coupled to the support member, and wherein the at least one latch mechanism includes a latched state and a released state, and wherein the latched state restricts the slidable coupling between the at least one of the right and left clamp and the support member, and wherein a size of the right and left clamp and support member correspond to a size of a beam;

a right and left housing coupled to the right and left clamp of the beam clamp system respectively, wherein the right and left housing include an attachment system and a pole attachment; and wherein the attachment system includes a low friction member and an attachment line, and wherein the attachment system is configured to remotely slidably translate the right and left clamp toward one another on the support member, and wherein the low friction member is coupled to one of the right and left housing, and wherein the attachment line extends over the low friction member and is fixably coupled to one of the right and left housing that is not coupled to the low friction member.

2. The system of claim 1, wherein the low friction member is a pulley.

3. The system of claim 1, wherein the attachment system includes two low friction members coupled to each of the right and left housing respectively.

4. The system of claim 1, wherein both the right and left clamp are slidably coupled to the support member, and wherein the support member includes a rope attachment member.

5. The system of claim 1, wherein the at least one latch mechanism includes a rotating lever that selectively locks with at least one of a plurality of notches disposed on the support member in the latched state, and wherein the rotating lever is spring biased toward the latched state.

6. The system of claim 1, wherein the right and left housing further include a release system comprising at least one release arm, at least one release pivot, at least one release attachment, and a release line, wherein the at least one release arm is rotatably coupled to at least one of the right and left housing about the at least one release pivot, and wherein the at least one release attachment is coupled to the latch mechanism, and wherein the release line is coupled to one of the at least one release attachment and is configured to engage the released state of the latch mechanism.

7. The system of claim 6, wherein the release attachment is coupled to the rotating lever such that retracting the release line causes the rotating lever to engage the released state.

8. The system of claim 1, wherein the right and left housing substantially cover the right and left clamp respectively.

9. The system of claim 1, wherein the right and left housing each include a front and rear housing member fixably coupled together via a plurality of couplers.

10. The system of claim 1, wherein the pole attachment includes a threaded female recess corresponding to a male threaded pole end.

11. The system of claim 1, wherein the pole attachment is configured to releasably couple with an extended pole for attaching the system to a beam.

12. The system of claim 1, wherein the attachment line extends away from the system to allow a user to remotely translate the right and left clamps toward one another across a beam thereby securing the system to a beam.

13. The system of claim 1, wherein the right and left housing are composed of at least one of plastic and aluminum.

14. The system of claim 1, wherein the beam onto which the system is configured to clamp includes at least one of a wide flange W-Section, wide flange H beam, and a standard S-Section I beam.

15. A method for remotely attaching a beam clamp system to a beam comprising the acts of:

providing a beam clamp system comprising a right and left clamp, at least one latch mechanism, and a support member, wherein at least one of the right and left clamp are slidably coupled to the support member, and wherein the at least one latch mechanism includes a latched state and a released state, and wherein the latched state restricts the slidable coupling between the at least one of the right and left clamp and the support member, and wherein a size of the right and left clamp and support member correspond to a size of a beam;

providing a right and left housing coupled to the right and left clamp of the beam clamp system respectively, wherein the right and left housing include an attachment system and a pole attachment, wherein the attachment system includes a low friction member and an attachment line, and wherein the attachment system is configured to remotely slidably translate the right and left clamp toward one another on the support member, and wherein the low friction member is coupled to one of the right and left housing, and wherein the attachment line extends over the low friction member and is fixably coupled to one of the right and left housing that is not coupled to the low friction member;

attaching a pole to the pole attachment;

positioning the beam clamp system across opposing sides of the beam;

retracting the attachment line causing the right and left clamp to translate toward one another along the support member; and clamping the beam clamp system onto the beam.

16. The method of claim 15 further including attaching a rope to the support member.

17. The method of claim 15, wherein the act of positioning the beam clamp system across a beam further includes elevating the beam clamp system and right and left housing to a position in proximity to the beam.

18. The method of claim 15, wherein the beam onto which the system is configured to clamp includes at least one of a wide flange W-Section, wide flange H beam, and a standard S-Section I beam.

19. A portable beam anchor system configured for remote attachment and release, the system being configured to clamp onto a beam, comprising:

a beam clamp system including a right and left clamp, at least one latch mechanism, and a support member, wherein at least one of the right and left clamp are slidably coupled to the support member, and wherein the at least one latch mechanism includes a latched state and a released state, and wherein the latched state restricts the slidable coupling between the at least one of the right and left clamp and the support member, and wherein the support member includes a rope attachment member, and wherein a size of the right and left clamp and support member correspond to a size of a beam;

a right and left housing substantially covering the right and left clamp of the beam clamp system respectively, wherein the right and left housing include an attachment system, a release system, and a pole attachment;

a release system comprising at least one release arm, at least one release pivot, at least one release attachment, and a release line, wherein the at least one release arm is rotatably coupled to at least one of the right and left housing about the at least one release pivot, and wherein the at least one release attachment is coupled to the latch mechanism, and wherein the release line is coupled to one of the at least one release attachment and is configured to engage the released state of the latch mechanism; and wherein the attachment system includes a low friction member, and an attachment line, and wherein the attachment system is configured to remotely slidably translate the right and left clamp toward one another on the support member, and wherein the low friction member is coupled to one of the right and left housing, and wherein the attachment line extends over the low friction member and is fixably coupled to one of the right and left housing that is not coupled to the low friction member.

20. The system of claim 19, wherein the low friction member is a pulley.

* * * * *